No. 797,873. PATENTED AUG. 22, 1905.
E. C. SPRINGER.
APPARATUS FOR SHARPENING MOWERS.
APPLICATION FILED NOV. 3, 1904.
2 SHEETS—SHEET 1.
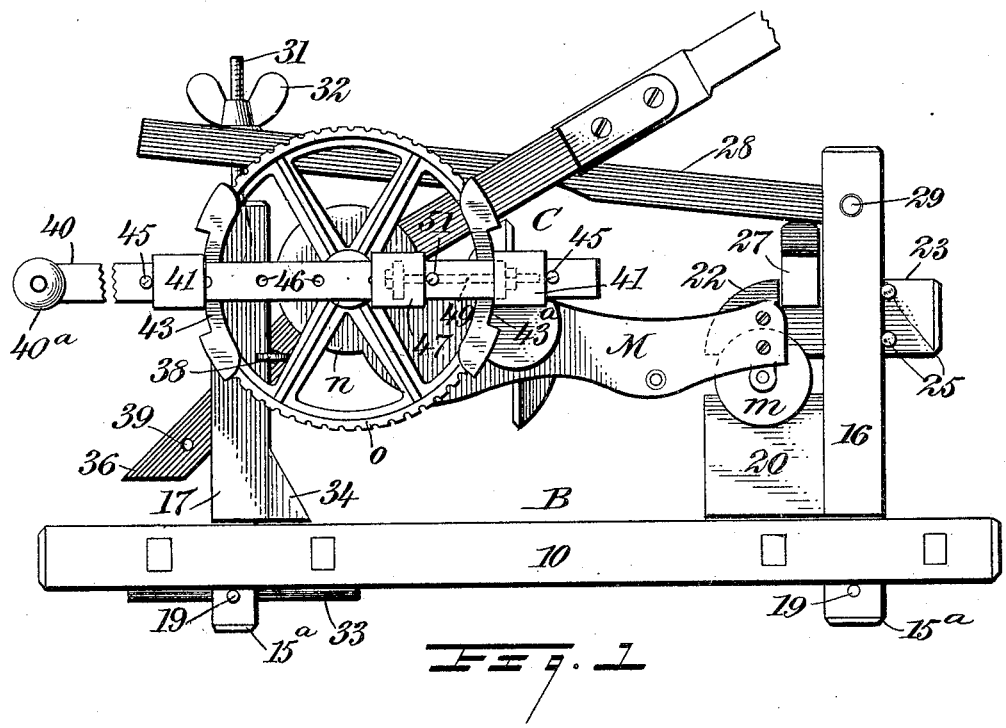
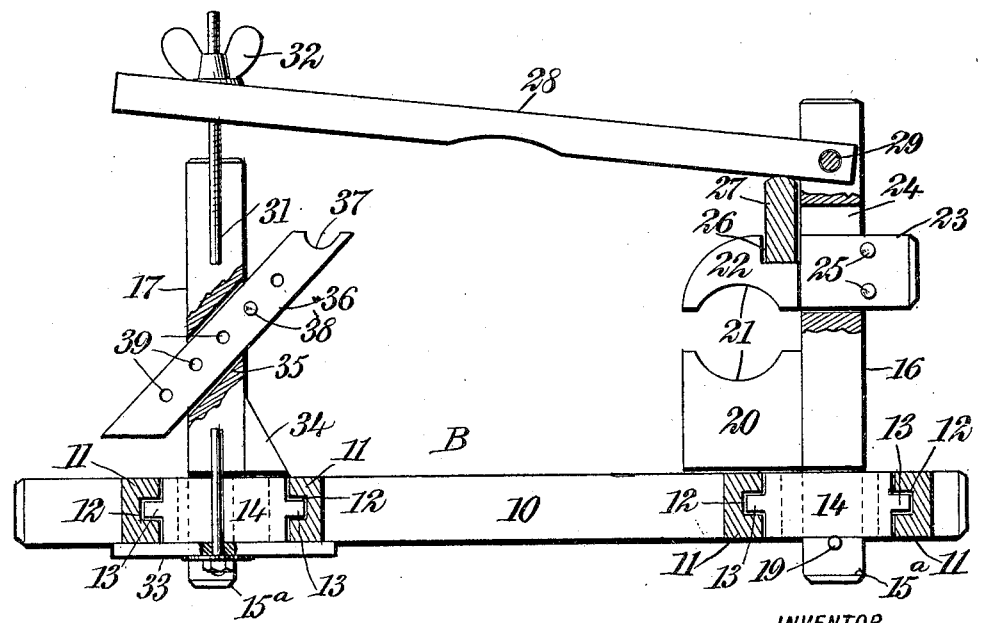
WITNESSES:
INVENTOR
Ernest C. Springer
BY
ATTORNEYS

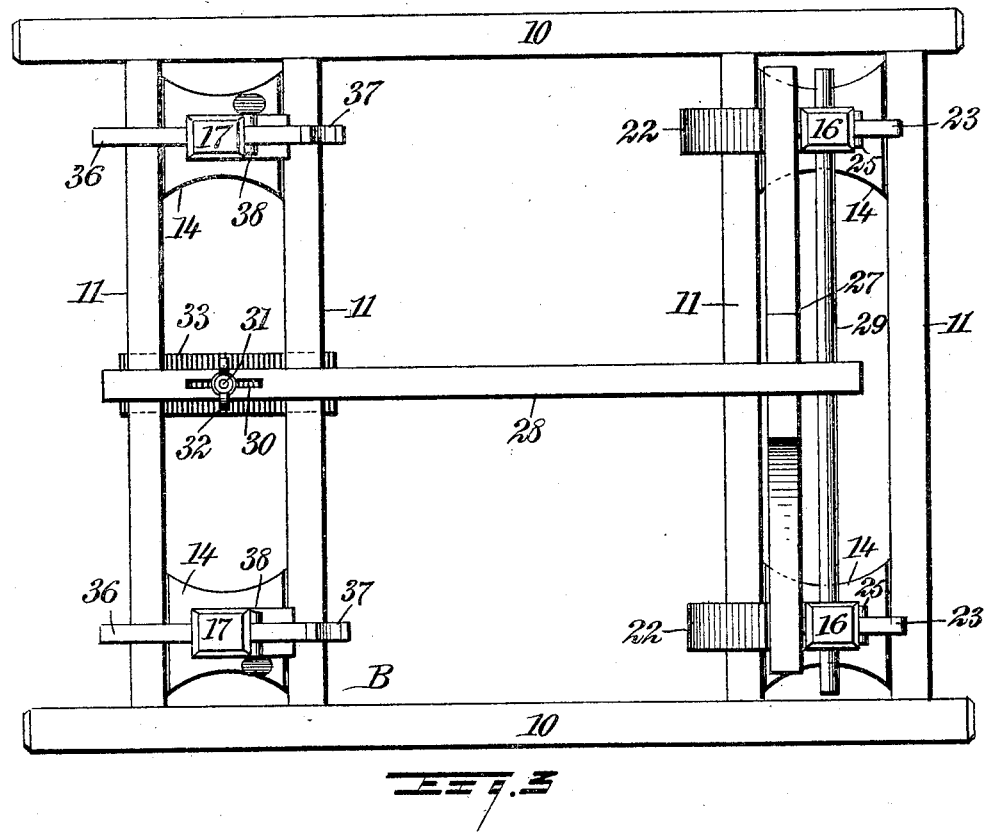
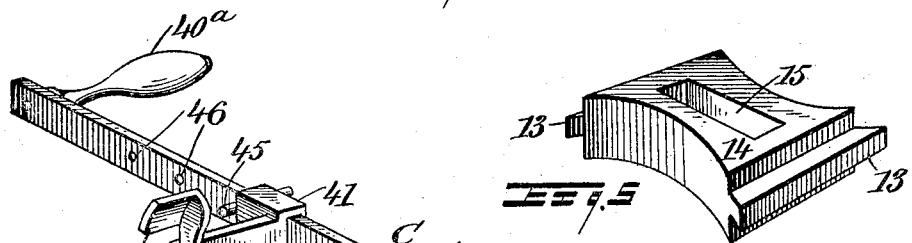
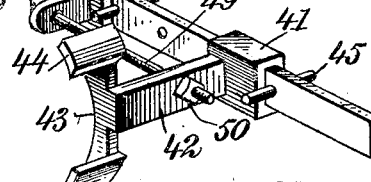
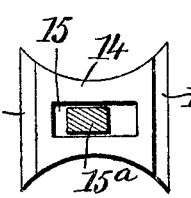

UNITED STATES PATENT OFFICE.

ERNEST C. SPRINGER, OF MASON CITY, IOWA.

APPARATUS FOR SHARPENING MOWERS.

No. 797,873.     Specification of Letters Patent.     Patented Aug. 22, 1905.

Application filed November 3, 1904. Serial No. 231,229.

*To all whom it may concern:*

Be it known that I, ERNEST C. SPRINGER, a citizen of the United States, and a resident of Mason City, in the county of Cerro Gordo and State of Iowa, have invented a new and Improved Apparatus for Sharpening Mowers, of which the following is a full, clear, and exact description.

My invention relates to apparatus for sharpening mowers, it being particularly applicable to what are commonly known as "lawn-mowers."

Its principal objects are to provide means for securely holding a mower and for revolving its working blades.

Reference is to be had to the accompanying drawings, forming a part of this specification, in which similar characters of reference indicate corresponding parts in all the views.

Figure 1 is a side elevation of one embodiment of my invention, a mower being shown in place therein. Fig. 2 is a central vertical longitudinal section through the apparatus, the mower being omitted. Fig. 3 is a full top plan view. Fig. 4 shows in perspective the crank member. Fig. 5 is a perspective view of one of the supporting-blocks, and Fig. 6 is a top plan view thereof with the coöperating base projection shown in section.

B designates a base-frame, which may consist of opposite side bars 10 10, having at each end pairs of connecting-bars 11 11. In these connecting-bars are opposite horizontally-alined grooves 12, which receive tongues or projections 13 from supporting-blocks 14, there being preferably two of these blocks between each pair of connecting-bars, they being movable in the grooves. The blocks 14 are provided with slots 15, which extend substantially at right angles to the bar-grooves and which receive the reduced portions 15$^a$ of pairs of posts 16 16 and 17 17. These reduced ends of the posts are preferably squared to prevent rotation in the slots and extend sufficiently below the blocks to allow the application of securing-pins 19, which are received by transverse openings.

Each of the posts 16 has secured to its inner lower portion just above the base-frame a bracket 20, in the upper face of which is a groove 21 and serving as one of a pair of holding members. The companion member 22 lies above the bracket 20, having a similar groove and a reduced portion or stem 23, which extends through a vertical slot 24 in the post. These movable members are held against displacement from the slots by means of pins 25 driven into openings in the stems outside the posts. These holding members are adapted to receive the supporting-roll $m$ of a mower M. At the upper side of each of the members 22 within its post is a transverse groove 26, in which rests a cross-bar 27. With the upper edge of this bar coöperates a lever 28, fulcrumed upon a rod 29, extending through openings in the posts 16 16. The opposite extremity of this lever is preferably slotted at 30, and through this slot passes a tension-rod 31, which is shown as having a nut 32 operating above the lever, while its head is retained by a short bar 33 contacting with the under sides of the connecting-bars 11.

The posts 17, which are situated at the end of the frame adjacent to the tension-rod, have reduced squared portions 15$^a$ and securing-pins 19, similar to those of the posts 16 and serving the same function. Each post 17 is also provided with an inward extension 34, adapted to contact with the upper face of the inner connecting-bar and acting as a brace. The brackets 20 may operate similarly in connection with the posts 16. Through each of the posts 17, extending longitudinally of the frame, is a forwardly and inwardly inclined slot 35 to receive a bar 36, having at its upper end a holding-groove 37. These bars are adjustable through the slots conveniently by means of pins 38, which are received by one or another of series of openings 39 and which rest against the inner faces of the posts. The holding-grooves are adapted to support such a part of the mower as the customary cross-rod which connects the casings $n$ thereof. It will be obvious that this portion of the apparatus may be adapted to a mower of any size, the width being controlled by sliding the blocks upon the connecting-bars and the length by moving the posts in the block-slots, while the relation of the elements to provide for variations in the diameter of the supporting-rolls and the position of the cross-rod may be adjusted by the movement of the members 22 in their slots and the shifting of the bars 36. When these have been properly arranged, the mower is clamped in position by forcing the members 22 against the mower-roll by means of the lever and tension-rod.

For attachment to one of the driving-wheels $o$ of the mower I preferably provide a crank member C, which is here shown as consisting of a bar 40, having a handle 40$^a$ and upon which slide sockets 41 41. Each of these sockets has projecting from it at one side an arm 42, and these have at their outer extremities oppositely-disposed clamp members 43 43ª, having inclined fingers 44 so positioned as to enable them to conform in a general way to the curvature of the driving-wheel. The movement of the sockets upon the bar may be limited by pins 45, which are received by a longitudinal series of openings 46 in said bar. Upon the bar between the sockets 41 is a third socket 47, having at one side an arm 48. Through openings in this arm and the arm of the clamp member 43 extends a tension member, which may be in the form of a bolt 49, having at one end outside one of the socket-arms a nut 50. The movement of this socket 47 may be limited by a pin 51 engaging one of the openings 46. In applying the crank member to the mower the clamp members are separated sufficiently to embrace the driving-wheel, the space between them being adjusted by moving the pins 45 in the openings. The clamp 43 is then drawn against the wheel by the tightening of the nut 50, the socket 47 and its arm being prevented from moving toward said clamp by the pin 51.

In the use of the apparatus, the mower which is to be sharpened having been secured in place and the crank member clamped upon one of its driving-wheels, some fine abrasive material, such as flour of emery, is mixed with oil and applied to the ledger-blade, whereupon by rotating the working blades in the opposite direction to that in which they rotate in use, by means of the crank member, their edges will be sharpened.

Having thus described my invention, I claim as new and desire to secure by Letters Patent—

1. An apparatus for sharpening mowers comprising a base, posts movable upon the base, and holding means carried by the posts for engaging front and rear portions of the mower.

2. An apparatus for sharpening mowers comprising a base, pairs of posts to support front and rear portions of the mower movable upon the base, and holding means carried by the posts and being movable thereon.

3. An apparatus for sharpening mowers comprising a base, supports movable upon the base, and posts to support front and rear portions of the mower movably mounted upon the supports.

4. An apparatus for sharpening mowers comprising a base, supports movable upon the base, and posts movable thereon in a direction substantially at right angles to the movement of the supports.

5. The combination with a base-frame having side bars and pairs of connecting-bars provided with opposite grooves, of blocks having tongues engaging the grooves and having vertical slots, posts movable in the slots, and holding means carried by the posts.

6. The combination with a base-frame having side bars and pairs of connecting-bars provided with opposite grooves, of blocks having tongues engaging the grooves and having vertical slots elongated in a direction substantially at right angles to the grooves, posts movable in the slots, and holding means carried by the posts.

7. An apparatus for sharpening mowers comprising a base, pairs of posts to support front and rear portions of the mower movable upon the base, holding means carried by the posts and including brackets fixed to said posts, and coöperating members movable toward and from the brackets.

8. An apparatus for sharpening lawn-mowers comprising a base, posts mounted upon the base, holding means carried by the posts and including brackets fixed to said posts, coöperating members movable toward and from the brackets, and a lever acting upon the movable members.

9. An apparatus for sharpening lawn-mowers comprising a base, posts mounted upon the base, holding means carried by the posts and including brackets fixed to said posts, coöperating members movable toward and from the brackets, a lever acting upon the movable members, and means for exerting a tension upon the lever.

10. An apparatus for sharpening lawn-mowers comprising a base, posts mounted upon the base, holding means carried by the posts and including brackets fixed to said posts, coöperating members movable toward and from the brackets, a bar engaging two of the movable members, and a lever coacting with the bar.

11. An apparatus for sharpening mowers comprising a base, posts provided with inclined slots mounted upon the base, bars extending through the slots, and adjustable retaining means coöperating with the bars.

12. An apparatus for sharpening mowers comprising a base, posts provided with inclined slots mounted upon the base, bars extending through the slots and having a series of openings, and pins engaging the openings and contacting with the posts.

In testimony whereof I have signed my name to this specification in the presence of two subscribing witnesses.

ERNEST C. SPRINGER.

Witnesses:
GEO. E. WINTER,
J. W. ADAMS, Jr.